Patented June 12, 1928.

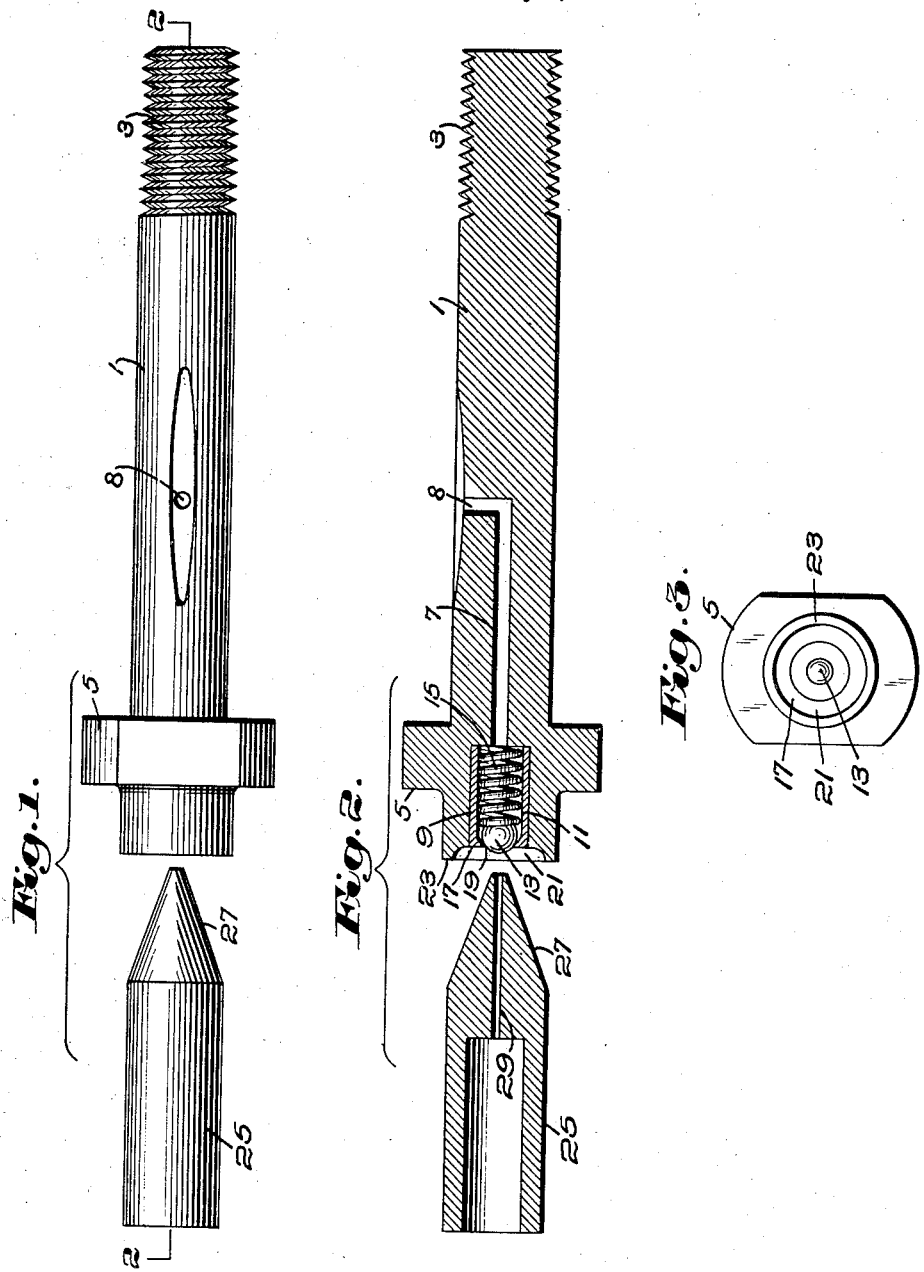

1,673,459

UNITED STATES PATENT OFFICE.

JOSEPH B. JURAD, OF NEWTON, MASSACHUSETTS.

BOLT AND LUBRICATOR THEREFOR.

Application filed July 5, 1924. Serial No. 724,210.

My invention relates to lubricators, and is particularly but not exclusively concerned with a bolt or pin to be used in connection with articulated structures.

My invention will be best understood from the following description when read in light of the accompanying drawing showing one specific embodiment of my invention, while the scope of my invention will be more particularly pointed out in the appended claims.

In the drawing:

Fig. 1 shows an elevation of a shackle bolt with an associated grease gun nozzle;

Fig. 2 is a longitudinal cross section on the line 2—2 of Fig. 1; and

Fig. 3 is an end view of the bolt looking from the left.

Referring to the drawing and to the preferred embodiment of my invention I have shown a bolt or pin which as illustrated is suitable for use in connection with spring shackles, being what is commonly termed a shackle bolt.

The bolt is provided with a shank 1 having the screw threaded portion 3 and carrying at one end the head 5. Further the bolt is provided with the longitudinally disposed lubricating passage 7 opening on the surface of the shank at 8 which passage at the head end of the bolt is enlarged as shown at 9. In the enlargement 9 I secure, preferably by means of a driving fit, a plug 11 which may be of any suitable construction, and as shown is in the form of a sleeve housing the spherical check valve 13 and spring 15 for yieldingly pressing the valve against the inturned portion 17 of the plug providing a valve seat 19.

As will be understood by those skilled in the art it is necessary to drive bolts and pins of the character described into their bearings, a hammer usually being employed for this purpose. In order to protect the valve and seat from the blows of the hammer I preferably recess the end face of the bolt as is indicated at 21 so as to provide an annular blow receiving surface 23 on the face of the bolt head, which surface projects longitudinally beyond the valve and surrounds the same.

In practice I provide the grease gun with a nozzle indicated at 25 which nozzle is provided with the frusto-conical end 27 and the lubricant discharge passage 29 opening on the apex of the portion 27. The apex of the frusto-conical portion is of smaller diameter than the valve seat which enables the valve to be opened when the nozzle is forced against it and the frusto-conical surface to seat against the valve seat.

Although I have described for purposes of illustration one specific embodiment of my invention it is to be understood that I am not limited thereby to its particular mechanical details, but that within the scope of my invention wide deviations may be made therefrom without departing from the spirit of my invention.

I claim:

1. A bolt having a head and a shank formed integrally with each other, said head being cupped on its end face to provide a raised portion integral therewith providing a surface for receiving the blows of a hammer, a passage for conveying lubricant to said shank and opening on said end face at the bottom of the cupped portion thereof, said passage being enlarged adjacent said end face, an outwardly opening check valve for said passage, a spring for said valve, a retaining plug for said valve and spring driven into said enlarged portion of said passage, said plug providing an opening for receiving the end of a nozzle of a pressure grease gun, said opening having a sealing edge for sealing the joint between said nozzle and plug, said sealing edge of said opening and said valve being disposed inwardly of the blow receiving surface of said head and surrounded thereby.

2. A driven member for forming a pin connection between relatively movable parts, said member having a longitudinally disposed lubricant conveying passage opening on the end thereof, an inwardly opening check valve at said end, a spring for said valve, retaining means for said valve and spring having an opening normally closed by said valve and providing a sealing edge for engaging and sealing the joint between said retaining means and the nozzle of a pressure grease gun; and said end of said driven member having a hammer blow receiving portion integral therewith projecting beyond said valve and said sealing edge, whereby said driven member may be driven without subjecting said sealing edge to the blow.

In testimony whereof, I have signed my name to this specification.

JOSEPH B. JURAD.